United States Patent
Colburn et al.

(10) Patent No.: US 9,462,909 B1
(45) Date of Patent: Oct. 11, 2016

(54) APPARATUS UTILIZING INFRARED EMISSIONS AND STEAM TO TREAT FOOD

(71) Applicant: IWD Holdings, LLC, Burlington, VT (US)

(72) Inventors: Michael G. Colburn, Burlington, VT (US); Stephen J. Bogner, Colchester, VT (US)

(73) Assignee: IWD Holdings, LLC, Burlington, VT (US)

( * ) Notice: Subject to any disclaimer, the term of this patent is extended or adjusted under 35 U.S.C. 154(b) by 0 days.

(21) Appl. No.: 14/266,503

(22) Filed: Apr. 30, 2014

Related U.S. Application Data

(60) Provisional application No. 61/818,081, filed on May 1, 2013.

(51) Int. Cl.
*A47J 37/12* (2006.01)
*A47J 27/00* (2006.01)
*A23L 1/01* (2006.01)
*A47J 27/04* (2006.01)

(52) U.S. Cl.
CPC ............ *A47J 27/004* (2013.01); *A23L 1/0121* (2013.01); *A23L 1/0128* (2013.01); *A47J 27/04* (2013.01)

(58) Field of Classification Search
CPC ............ F24D 1/00; H05B 6/64; H05B 6/68; H05B 3/02; A21B 1/00; A21B 1/22
USPC ......... 99/324, 325, 330, 331, 340, 403, 410, 99/416, 417, 447, 450, 467, 468, 473, 474, 99/476; 219/200, 385, 391, 399, 401, 400; 426/506, 509, 510, 511, 520, 523, 590, 426/665; 126/1 R, 19 R, 20, 344, 369
See application file for complete search history.

(56) References Cited

U.S. PATENT DOCUMENTS 3,736,860 A * 6/1973 Vischer, Jr. ............. F24C 7/087
 219/388
4,254,325 A * 3/1981 Snyder .......................... 219/413

(Continued)

FOREIGN PATENT DOCUMENTS

WO WO 20131025208 2/2013

OTHER PUBLICATIONS

Watlow Electric Manufacturing Company, "Radiant Heating with Infrared", 1997, St. Louis, MO.

(Continued)

*Primary Examiner* — Dana Ross
*Assistant Examiner* — Joseph Iskra
(74) *Attorney, Agent, or Firm* — Thomas G. Ference

(57) ABSTRACT

An apparatus for treating food, the apparatus includes a housing having a lid, a base and a cavity defined therein. The cavity is separated into an upper chamber and lower chamber by a divider. Upper chamber is for holding food placed upon the divider. One or more steam sources provide steam to the upper and lower chambers. One or more infrared sources are position within the upper and lower chambers to directly heat the steam, the food or the divider. A pressure-controlled environment may be provided in the upper chamber. Uniformity and increased speed of heating the food is facilitated by direct heat transfer in the upper chamber and by indirect heat transfer from the conduction of heat through the divider from the lower chamber.

26 Claims, 18 Drawing Sheets

(56) References Cited

U.S. PATENT DOCUMENTS

| | | | |
|---|---|---|---|
| 4,421,974 A | 12/1983 | Oota et al. | |
| 4,441,016 A | 4/1984 | Oota et al. | |
| 4,617,452 A | 10/1986 | Miwa | |
| 4,670,282 A | 6/1987 | Onishi et al. | |
| 4,672,179 A | 6/1987 | Onishi et al. | |
| 5,279,213 A | 1/1994 | Miyahara | |
| 5,400,701 A | 3/1995 | Sham | |
| 5,636,317 A | 6/1997 | Reznik | |
| 5,652,006 A | 7/1997 | Assinder et al. | |
| 5,727,448 A | 3/1998 | Sa | |
| 5,938,959 A * | 8/1999 | Wang | A47J 37/0623 126/20 |
| 6,173,643 B1 | 1/2001 | Qian et al. | |
| 7,368,685 B2 | 5/2008 | Nam et al. | |
| 7,683,292 B2 * | 3/2010 | Cavada | F24C 7/04 219/391 |
| 7,903,956 B2 | 3/2011 | Colburn | |
| 7,967,002 B2 * | 6/2011 | Inada et al. | 126/21 A |
| 2004/0131738 A1 * | 7/2004 | Holm et al. | 426/511 |
| 2004/0197451 A1 | 10/2004 | Mohammed | |
| 2009/0230125 A1 * | 9/2009 | Kono | A47J 27/004 219/680 |
| 2011/0017078 A1 * | 1/2011 | O'Connell | 99/448 |
| 2011/0266272 A1 | 11/2011 | Colburn et al. | |

OTHER PUBLICATIONS

Hugh R. Carlon, "Final Report: Infrared Absorption by Water Clusters", Technical Report ARCSL-TR-79013, Mar. 1979, US Army Armament Research and Development Command, Chemical Systems Laboratory, Aberdeen Proving Ground, Maryland 21010.
John D. Correll and Harold D. Wells, Applied Cooking Technology for the Food Service Operator, 1979, Black Body Corporation, St. Louis, MO.

* cited by examiner

Heating Avenues

| Heating Avenue | Description | Chamber Heating Occurs | Infrared Emissions (microns) | Steam | Steam Type | Divider Type | Food Heat Transfer Method |
|---|---|---|---|---|---|---|---|
| A | Latent Heat Transfer from Upper Steam to Food | Upper | None | Upper Steam | Pressurized | Solid | Direct to Food |
| B | Latent Heat Transfer from Lower Steam to Food | Upper | None | Lower Steam | Atmospheric (free venting) | Perforated | Direct to Food |
| C | IR Heating Food | Upper | 0.3 - 9.0 | None | None | Solid or Perforated | Direct to Food |
| D | IR Heating Divider | Lower | 0.3-9.0 | None | None | Solid | Indirect to Food |
| E | Super Heating Upper Steam | Upper | > 2.5 | Upper Steam | Pressurized | Solid | Direct to Food |
| F | Super Heating Lower Steam, Move Steam Through Divider | Upper | > 2.5 | Lower Steam | Atmospheric (free venting) | Perforated | Direct to Food |
| G | Super Heating Lower Steam, Conduction Through Divider | Lower | > 2.5 | Lower Steam | Atmospheric (free venting) | Solid | Indirect to Food |
| H | Latent Heat Transfer from Steam to Divider, Conduction Through Divider | Lower | N/A | Lower Steam | Atmospheric (free venting) | Solid | Indirect to Food |
| I | IR Heating Condensed Water Layer, Conduction Through Divider | Lower | Majority of Wavelengths greater than 2.0 microns | Lower Steam | Atmospheric (free venting) | Solid | Indirect to Food |
| J | IR Heating Divider, Conduction Through Divider | Lower | Majority of Wavelengths less than 2.0 microns | Lower Steam | Atmospheric (free venting) | Solid | Indirect to Food |

Figure 14

Example Cooking Modes

| Examples | Mode | Type of Cooking | Heating Avenues Used | Comments |
|---|---|---|---|---|
| 1 | Steam Cooking | Pressure Steaming | A | This mode operates like a pressure cooker. Steams heat and latent heat are transferred by contact with the food and remains in contact condensing until enough pressure builds in the chamber to release pressure. This is a moiste cooking mode that softens food and flavors blend in the foods cooked. Food color fades. |
| 2 | Broiler Cooking | Broiling, Browning, Surface melting | C | Infrared in the shorter wavelengths acts like an oven broiler. Tuning the wavelength can cause different affects to the food. This style is a food surface treatment with heat from the surface conducting through the food item. |
| 3 | Convection Steam cooking | Steam Cooking | B | In this mode Steam convects through food briefly making contact but moving on to vent.(open vented steam) prior to fully condensing. In this way steam gives up its latent heat but is replaced by more steam. The result is chrisp food products (vegetables) with enhanced colors. |
| 4 | Hot Food holding, slow cooking | Simmering, Hold Hot | D | Infrared directly to the divider in the longer wavelengths converts to a conducted low temperature to the food in the upper chamber. |
| 5 | Baking, Roasting | Static oven style cooking | D, C | Upper and Lower IR combined at different wavelengths to create an oven environment in the upper compartment. |
| 6 | Higher Temperature Cooking | Boiling, braising | G, H, I,J | In this mode shorter wavelength (hotter) Infrared waves convert to heat in the solid divider surface, in the water film on the divider surface and in water molecules in steam interjected in the space between the divider and the Infrared emitters. Steam with added heat is created as are higher temperatures at the divider surface. The particular wavelength properties combine to achieve the combined effect. A longer primary wavelength infrared combined with steam surrounding the divider creates an ideal food holding or simmering environment without drying or burning the food. A shorter primary wavelength creates a hotter application for boiling or braising food. |
| 7 | Speed Cooking, Food treatments | Rice cooking, stews, cerals, speed processing, Dense products (Roasts,root vegetables) | A, G,H,I,J | In this mode the befefits of mode 6 (above) are combined with the benefits of upper comparment steam to achieve more rapid results |
| 8 | Special Food Treatment | Any | A, C, D,E,G,H ,I,J | Apply different treatments to food in sequences, such as a roast cooking in mode 7, followed by a period of time at mode 2 to brown the surface |

Figure 15

APPARATUS UTILIZING INFRARED EMISSIONS AND STEAM TO TREAT FOOD

RELATED APPLICATIONS

This application claims the benefit of priority of U.S. Provisional Patent Application No. 61/818,081, filed May 1, 2013 entitled "Apparatus and Method Utilizing Infrared and Steam to Treat Food", which is incorporated herein by reference.

FIELD

This patent application generally relates to an apparatus for treating food. More specifically it relates to an apparatus having an upper chamber, a lower chamber and a divider there between; food held on top of the divider is treated by direct heat transfer in the upper chamber and by indirect heat transfer through the divider from the lower chamber.

BACKGROUND

Infrared radiation (IR) is well known in heating applications and has been implemented in foodservice for functions like toasting and broiling. Infrared radiation comprises energy waves that are generated by an emitter and travel at the speed of light, in straight lines until intercepted by an object. When an object is encountered the energy waves can be absorbed, reflected, or transmitted through the object where they continue to travel until encountering another object. When the infrared energy waves are absorbed; the energy converts to heat within the object that has absorbed the energy resulting in heating of the object. This process is known as radiant heating.

Infrared radiation energy waves are part of the electromagnetic spectrum and are classified by their wavelength and frequency. Infrared radiation energy waves are identified as a segment of the electromagnetic wave spectrum that lies between visible light and microwaves. IR displays characteristics of visible light at the shortest wavelength extreme and microwaves at the longest wavelength extreme. The infrared electromagnetic spectrum ranges approximately between 0.7-microns and 400-microns. Segments of the span are considered to be near IR (0.7 to 1.3 microns), mid IR (1.3 to 3.0 microns) and far IR (3.0 to 400 microns). The infrared wavelengths used most for thermal heat transfer are typically in the range of 3-30 microns. Infrared wave emitters used for thermal applications in food processing usually fall between 1.0 and 9.0 microns.

Infrared radiation heating is ideal for non-contact heating. IR heating has the ability to heat an object without the energy emitter contacting the object, unlike convection heating or conductive heating which both convey heat by a medium in contact with the object being heated. Radiated infrared energy does not heat the space through which the IR travels so long as any material in that space does not absorb the IR.

Steam is another well-known heating method. Steam has been implemented in foodservice for steam cooking, food/water heating, and food holding applications. Steam is a powerful heating medium in that steam fills voids in confined spaces. Steam is also powerful for heating in that steam stores latent heat that is released on contact with a colder object resulting in the object being heated. The latent heat potential is obvious if one has ever had their skin come in contact with 212° F. steam, a burn and blistering can be immediate; however putting one's hand in a 212° F.+ oven does not result in immediate burning.

When applying infrared heat or steam to perform heating certain problems can occur. For example an object will receive non-uniform heating based on the pattern of the IR waves impinging upon the object. If the emitter is in a figure eight, the object to be heated will receive a pattern of infrared waves in a figure eight. This figure eight pattern will be absorbed as energy and will create heat in a figure eight pattern in the object to be heated. The balance of the object outside the figure eight pattern will have to be heated by conduction through the object from the figure eight pattern. This characteristic of IR can result in overheating and burning in the area where the energy is directly absorbed and under-heating in other areas where in heat is not directly absorbed.

Steam condenses when the steam touches any object colder than the temperature of the steam and leaves a water film at the location of condensation. It is difficult to direct steam just to the object to be heated, since the steam fills all voids and touches all surfaces very quickly. This process of heating all surfaces, and not just the surfaces of the product intended to be heated, requires more latent heat and thus more steam to be supplied to bring all surfaces to the desired temperature. Another problem is that the water film left by condensing steam can serve as an insulation barrier to the object to be heated; this requires new steam to first heat the water layer and then the object to be heated, making steam heating less efficient.

An important consideration in using IR for heating is the output wavelength generated by the emitter since different wavelengths have different characteristics. Furthermore, the IR energy waves that reach an object to be heated display different characteristics depending on the physical nature of the object. When creating or selecting an emitter for heating applications it is important to select or create an emitter that is "tuned" to an optimum wavelength that is most appropriate for the application. An emitter tuned to the optimum wavelength will provide a higher percentage of the optimum wavelength and will heat most efficiently for the application. Wavelengths that are not absorbed by the object do not take part in heating as they reflect away from the object or are transmitted through the object. These non-absorbed energy wavelengths travel until they encounter an object that is more tuned to absorb their particular wavelength.

Absorption and emissivity are two properties of an object that directly follow each other. These properties determine how well the object will absorb infrared energy waves. Objects are rated in emissivity values on the basis of a blackbody rating which is valued at 1 for a perfect black body. A perfect black body would absorb 100-percent of the radiant energy that strikes it. A perfect black body does not exist.

Absorption of radiation is a selective phenomenon depending greatly on the incident wavelength. Most of the emitters used in food heating range from peak values of 1.0-9.0 microns. Planck's curves, a known research tool, show that a film of water thicker than 0.05 mm will absorb much of the infrared radiation longer than 2.5-microns. Water is rated very high in absorption with an emissivity value of 0.93 for wavelengths greater than 2.5-microns. The water vapor will absorb little of the infrared radiation shorter than 2.5-microns. When IR radiant energy shorter than 2.5-microns encounter water film or vapor most of the short wavelength infrared (1.0-2.5 microns) is transmitted though the water or vapor without absorption. The short wavelengths are closer to light on the electromagnetic spectrum, and like light through a window, the energy travels through the vapor. The longer wavelengths greater than 2.5-microns, however, are further from the visible light wavelength and are absorbed by the water molecules creating an increase in temperature in the water molecules.

The differences in the spectral absorption/transmission of water layers and water vapor can be observed in FIGS. 1a and 1b. Details of the associated mechanisms are described for FIG. 1a in "Radiant Heating with Infrared" by Watlow Electric Manufacturing Company, and for FIG. 1b in "Infrared Absorption by Water Clusters" by Hugh R. Carion, the entire disclosure of both which are herein incorporated by reference.

Rapid and high quality preparation of food is required in today's food industry. The present patent application puts forth a novel apparatus that combines infrared radiant energy and steam in unique ways to provide a combination of direct and indirect heating of food that achieves improved thermal treatment of food resulting in faster cooking times and more uniform heating of the food.

SUMMARY

One aspect of the present patent application is directed to an apparatus for treating food. The apparatus comprises a housing including a lid portion and a base portion, the lid portion and base portion separable and defining a cavity therein. The cavity is divided into an upper chamber and a lower chamber by a divider. The upper chamber is for holding food. A steam source is connected to provide upper steam to the upper chamber and lower steam to the lower chamber. A lower infrared source is positioned within the lower chamber. An upper infrared source may be positioned within said upper chamber. The food is heated by direct heat transfer in the upper chamber and the food is heated by indirect heat transfer from the conduction of heat through the divider from the lower chamber.

Another aspect of the present patent application is directed to an apparatus for treating food. The apparatus comprises a housing including a lid portion and a base portion, the lid portion and base portion separable and defining a cavity therein. The cavity is divided into an upper chamber and a lower chamber by a divider. The upper chamber is for holding food. A steam source is connected to provide upper steam to the upper chamber and lower steam to the lower chamber. A lower infrared source is positioned with the lower chamber. The food is heated by direct latent heat transfer from upper steam in the upper chamber. The food is heated by indirect heat transfer through the divider of localized radiant energy of the second lower-chamber wavelength. The food is heated by indirect heat transfer of latent heat provided by the lower steam through the divider, wherein the lower steam is heated by the first lower-chamber wavelength and provides a uniform distribution of heat to the divider from the lower chamber.

Yet another aspect of the present patent application is directed to a method for cooking food. The method comprises providing an upper chamber, a lower chamber and a divider there between. The upper chamber has an upper steam source composed of upper water molecules. The lower chamber has a lower steam source composed of lower water molecules and a lower infrared source emitting lower radiant energy. The method further comprises heating the upper chamber with the upper steam source, heating the lower chamber with the lower steam source, heating the divider with the lower radiant energy and heating the lower water molecules with the lower radiant energy.

BRIEF DESCRIPTION OF DRAWINGS

The foregoing and other aspects and advantages presented in this patent application will be apparent from the following detailed description, as illustrated in the accompanying drawings, in which:

FIG. 14 is a chart listing various heating avenues that may occur in the apparatus shown in FIGS. 2-4 and 7;

FIG. 15 is a chart listing various example cooking modes that may be used in the apparatus shown in FIGS. 2-4 and 7;

DETAILED DESCRIPTION

Figure 1A:
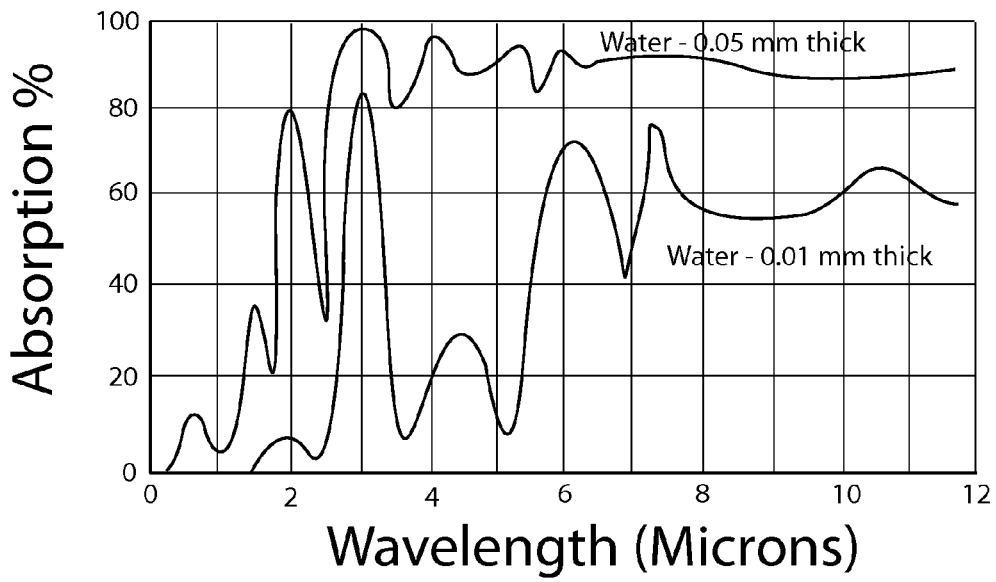
FIG. 1a is a graph showing the absorption of infrared energy in water as a function of water layer thickness and the wavelength of the impinging infrared radiation.
Figure 1B:
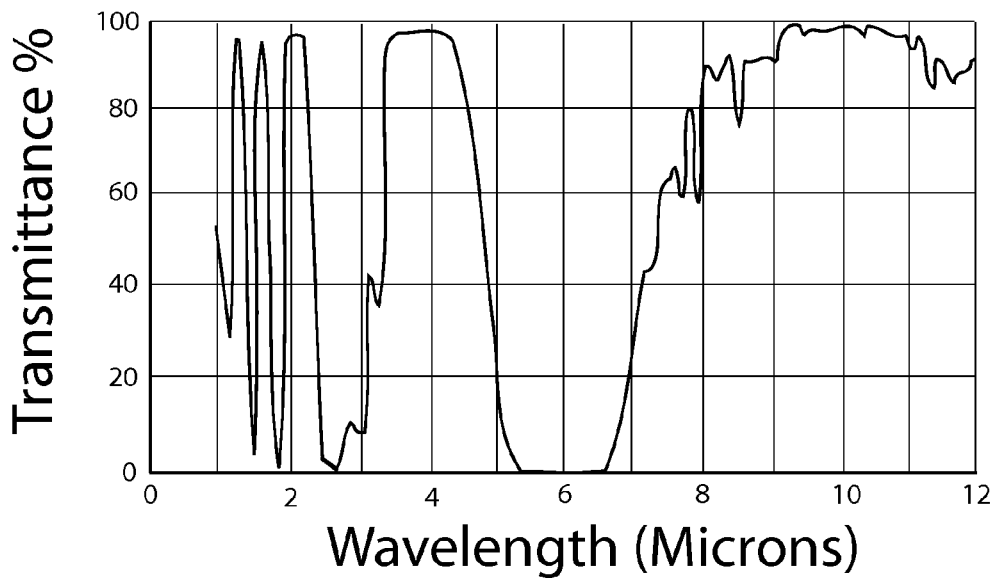
FIG. 1b is a graph showing the transmission of infrared energy through water vapor as a function of the wavelength of the impinging infrared radiation.

Apparatus 30 for treating food 32 is illustrated in FIGS. 2-4 and 7-12. Food 32 may be any solid or liquid material used in the food preparation industry. Apparatus 30 comprises a housing 34 including lid portion 36 (a.k.a. lid) and base portion 38 (a.k.a. base). Lid portion 36 and base portion 38 are separable and define cavity 40 therein. Cavity 40 is divided into upper chamber 42 and lower chamber 44 by divider 46. Upper chamber 42 is for holding food 32. A steam source 50 is connected to provide upper steam 52 composed of upper water molecules to upper chamber 42 and lower steam 54 composed of lower water molecules to lower chamber 44. A lower infrared source 56 is positioned within lower chamber 44. Lower infrared source 56 has a lower-chamber wavelength 82 output. A single lower infrared source 56 may emit from the same emitter both a first lower-chamber wavelength 82a and a second lower-chamber wavelength 82b. Alternatively, lower infrared source 56 may include a first lower infrared source 56a and a second lower infrared source 56b, which respectively emit first lower-chamber wavelengths 82a and second lower-chamber wavelengths 82b. An upper infrared source 58 may be positioned with upper chamber 42. Food 32, within upper chamber 42 and held upon divider 46, is heated by direct heat transfer in the upper chamber and by indirect heat transfer from the conduction of heat through the divider from lower chamber 44. Apparatus 30 is provided with two distinct spaces for heating food 32. The division of cavity 40 into upper chamber 42 and lower chamber 44 allows for the application of at least two distinct types of heating methods to be applied to the same food item from different sides at the same time. The combination of these two distinct heating methods provides for unique heating properties to be applied to food 32, which result in improved heating uniformity and reduced heating time.

Figure 2:
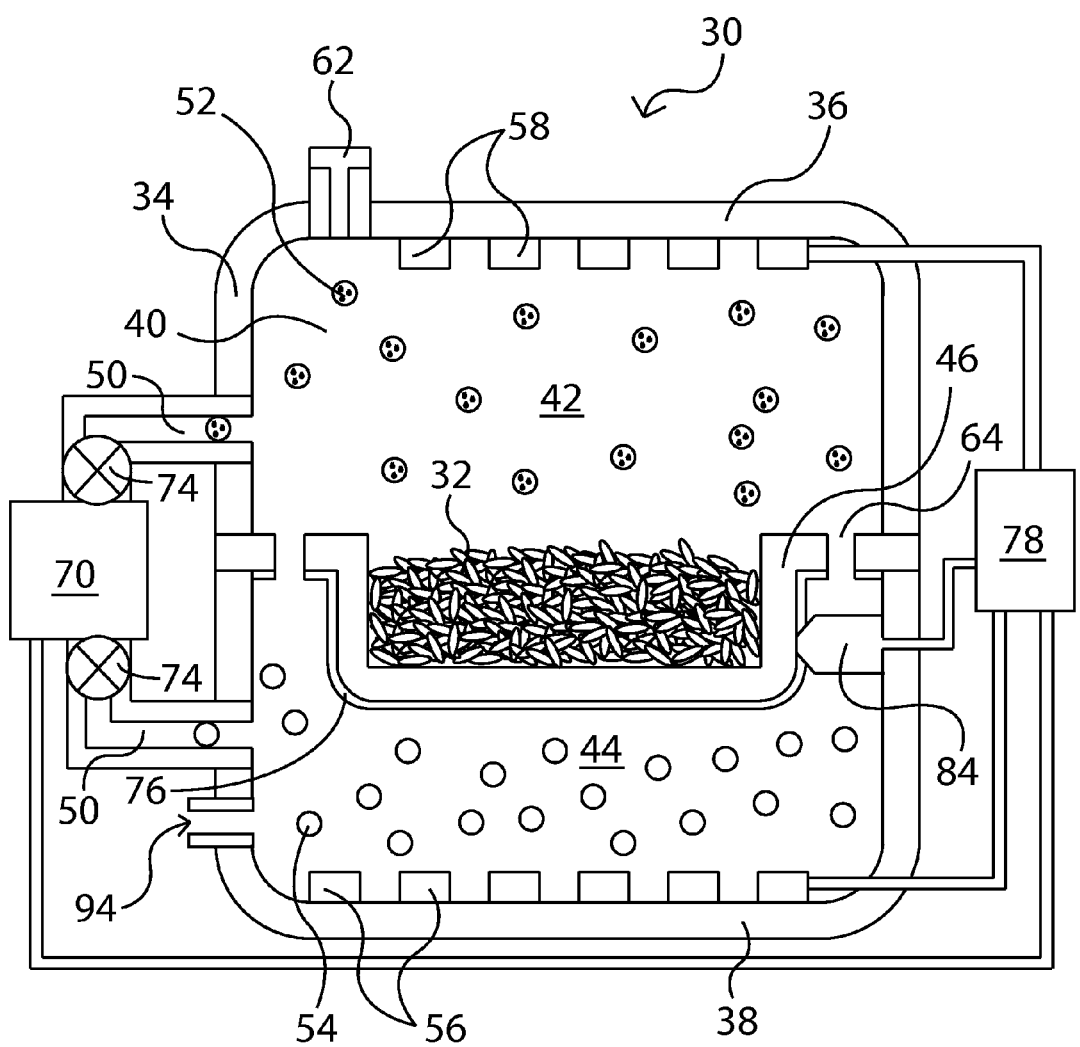
FIG. 2 is a sectional, schematic diagram of an apparatus for treating food according to an embodiment of the present patent application.
Figure 3:
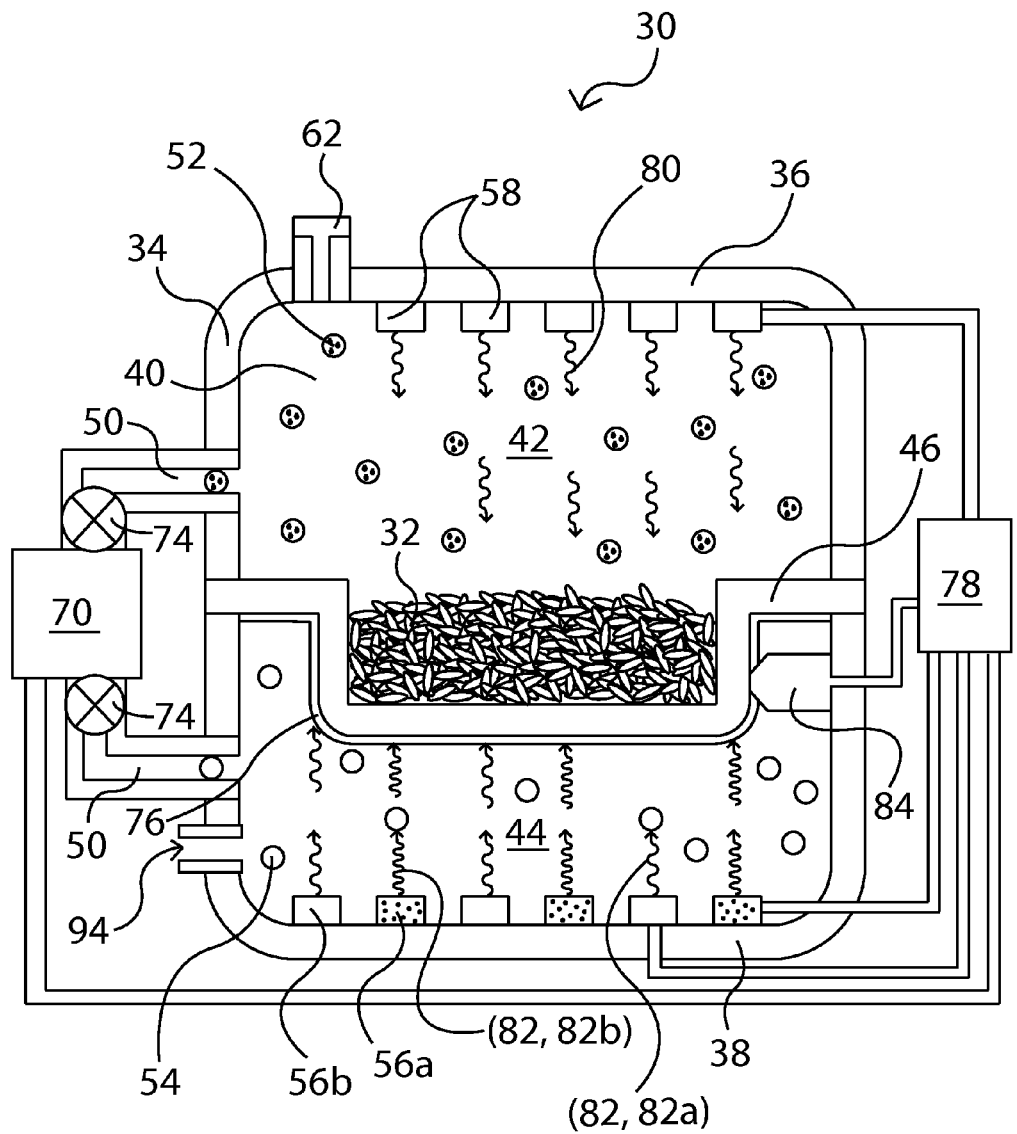
FIG. 3 is a sectional, schematic diagram of the apparatus for treating food in FIG. 2, showing alternative features of the apparatus.
Figure 4:
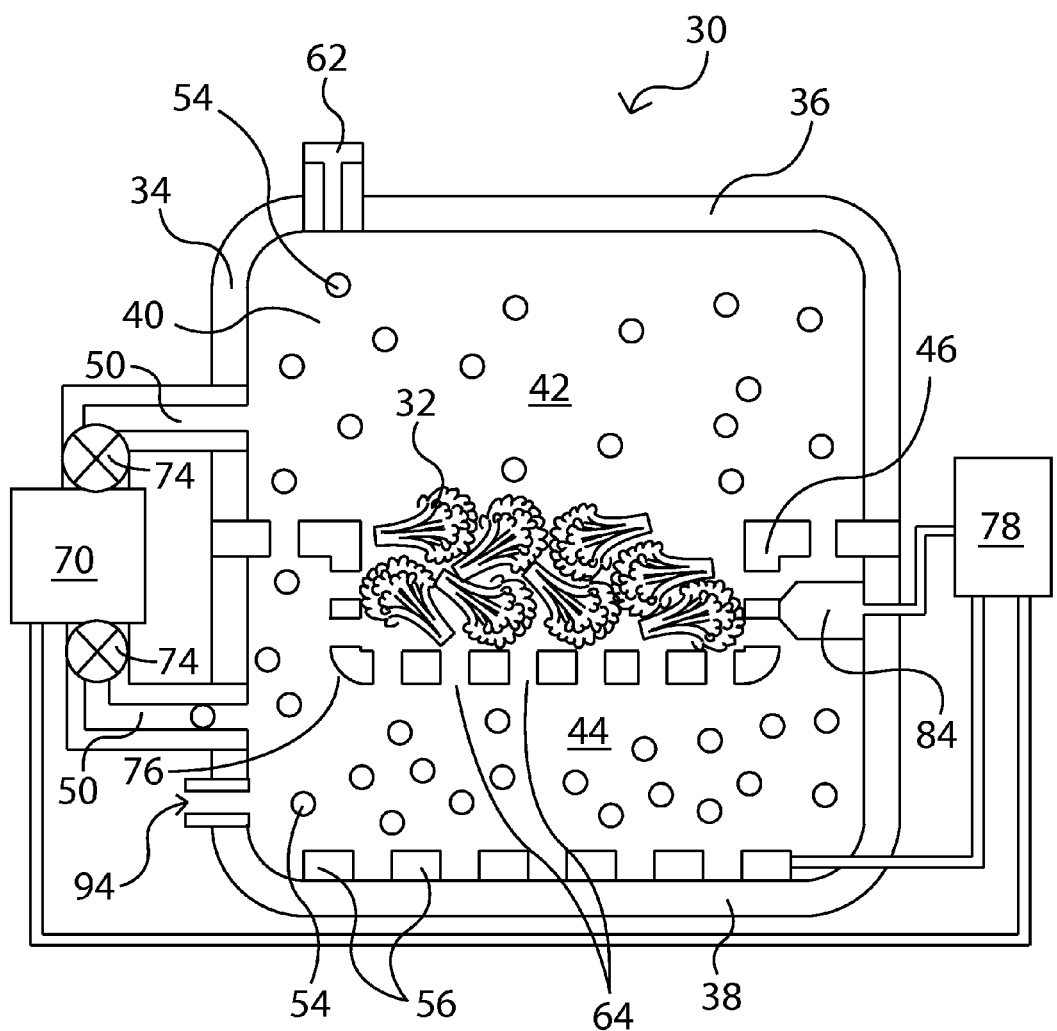
FIG. 4 is a sectional, schematic diagram of the apparatus for treating food in FIG. 2, showing alternative features of the apparatus.

Apparatus 30 can be of generic form as depicted in FIGS. 2-4 or may have specific structural variations as shown in FIGS. 7-12. Lid portion 36 and base portion 38 define cavity 40. Lid portion 36 and base portion 38 may be a single layer of material such as metal or plastic, or they may be a composite structure having multiple layers of material. The layers may incorporate insulating material to aid in confining heat to cavity 40. A hinge 60 may be added connecting lid portion 36 to base portion 38 so that the lid portion is hingeably attached to the base portion for opening and closing cavity 40.

Divider 46 may be a removable divider. Lid portion 36 may seal with divider 46 to create a sealed upper chamber 42 on top of the divider when the lid portion is closed. When closed and sealed, a pressure-controlled environment may be created in upper chamber 42. Divider 46 may be recessed to form a pan that holds a quantity of food. Divider 46 may be a plurality of pans, each for holding a different quantity of food 32. Divider 46 may also have perforations 64 that allow steam to pass between lower chamber 44 and upper chamber 42. Divider 46 is preferably made of a highly thermally conductive material that aids in indirect heat transfer from lower chamber 44 to food 32.

A steam source 50 may be produced by a single steam generator 70 or an upper steam generator 70a and lower steam generator 70b. When one steam generator 70 is used, the steam generator is connected to provide upper steam 52 to upper chamber 42 and lower steam 54 to lower chamber 44. When multiple steam generators are used, upper steam generator 70a is connected to provide upper steam 52 to upper chamber 42 and a lower steam generator 70b is connected to provide lower steam 54 to lower chamber 54. Various types of steam generators, which work on different steam generation principles, may be used as the steam generator. However, a preferred method of steam generation is disclosed in U.S. Pat. No. 7,903,956 to Colburn et al., titled "Rapid Liquid Heating", U.S. patent application Ser. No. 13/023,891 to Colburn et al., titled "Steam Generator System" and International Application No. PCT/US2011/048007 to Colburn et al., titled "Steam Generator System"; the entire disclosure of all three which are herein incorporated by reference. These steam generators generate steam from an aqueous solution directly heated by passing current through the aqueous solution. Valves 74 may be included to help regulate steam flow between generator(s) and upper chamber 42 and lower chamber 44. In upper chamber 42, direct heat transfer to food 32 is from upper latent heat stored in upper steam 52 being transferred to the food. In lower chamber 44, indirect heat transfer to food 32 occurs from lower latent heat stored in lower steam 54 being directly transferred to a condensed water layer 76 on the bottom of divider 46 and then further having that heat transferred indirectly by conduction through the divider to the food. In lower chamber 44, indirect heat transfer to food 32 may also occur by radiant energy from said lower infrared source 56 being transferred through divider 46.

Figure 5A:
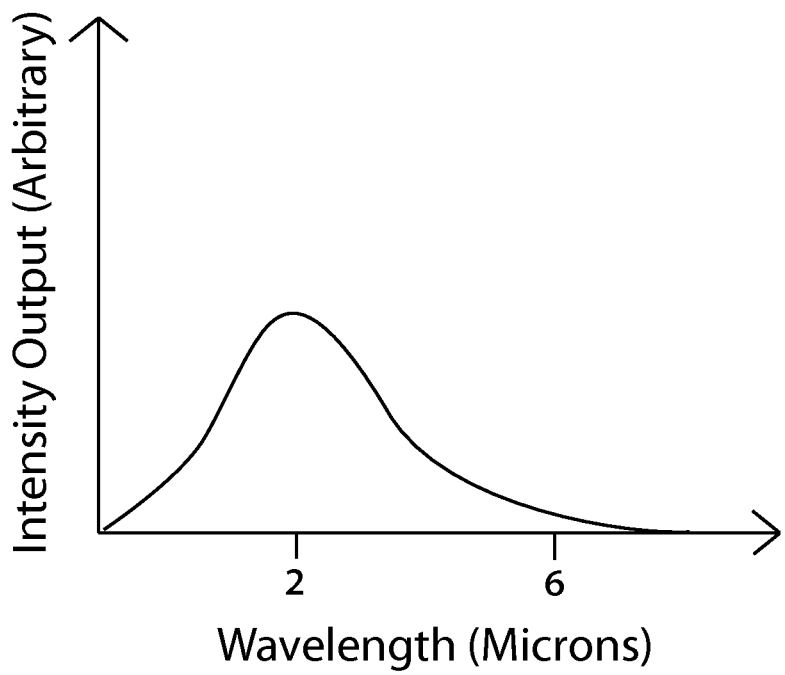
FIG. 5a is a graph depicting intensity distribution as a function of wavelength for an emitter.
Figure 5B:
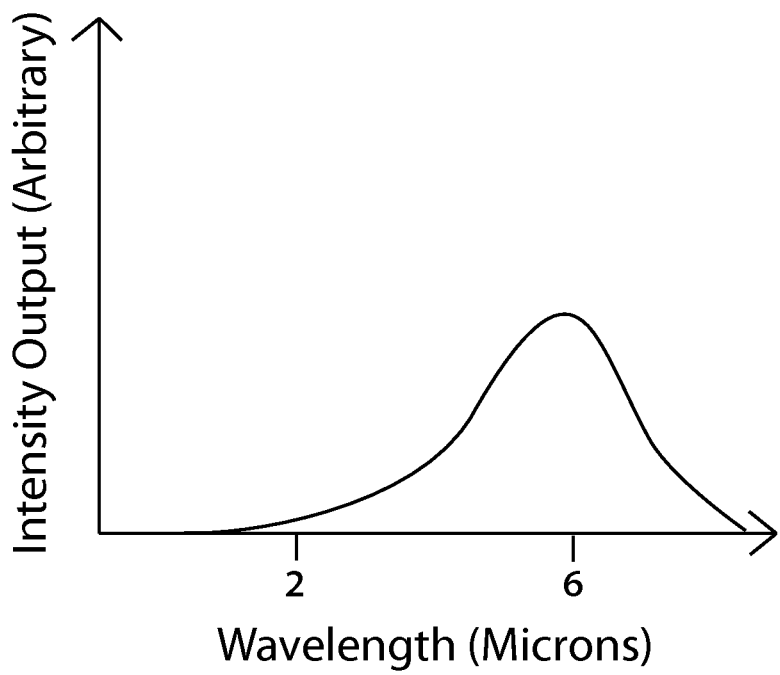
FIG. 5b is a graph depicting intensity distribution as a function of wavelength for the emitter in FIG. 5a, now with a different applied power.

Lower infrared source 56 positioned within lower chamber 44 and upper infrared source 58 positioned within upper chamber 42 both emit radiant energy. Infrared sources 56 and 58 may be nickel chromium wound wire, a mercury vapor lamp, etc. A control system 78 is provided to power the emitters controlling their intensity and wavelength. These emitters may be tunable to emit infrared energy at different wavelengths depending on the power supplied from control system 78, FIG. 5a and 5b. Alternatively, each infrared source 56 and 58 may be a combination of infrared sources that are tuned to emit infrared energy in different distinct wavelengths, FIGS. 6a and 6b.

In upper chamber 42, upper infrared source 56 provides upper radiant energy at an upper wavelength 80. Upper radiant energy may provide direct heating to food 32 or direct heating to upper steam 52. The amount of direct heating of upper steam 52 is dependent on the upper wavelength 80 and whether the upper wavelength is transmitted or absorbed by the steam. For example, most wavelengths of greater than 2.5-microns are highly absorbed by steam and will superheat upper steam 52. Alternatively, most wavelengths of less than 2.5-microns are highly transmitted by steam, will pass through upper steam 52, and directly heat food 32. Control system 78 can be used to tailor how much upper radiant energy is used for superheating steam and how much upper radiant energy is used for direct heating of food 32. The upper chamber heating scenarios discussed above provide different heating avenues for providing direct heat to food 32.

In lower chamber 44, lower infrared source 56 provides lower radiant energy at lower-chamber wavelengths 82 (first lower-chamber wavelength 82a or second lower-chamber wavelength 82b). Lower infrared source 58 may be a combination of lower infrared sources 56a and 56b, each having a different lower-chamber wavelength. Lower radiant energy may provide direct heating to divider 46, direct heating to water layer 76, or direct heating to lower steam 54. The amount of direct heating of lower steam 54 is dependent on the wavelength of lower-chamber wavelength 82 and whether the lower-chamber wavelength is preferentially transmitted or absorbed by the steam. For example, most first lower-chamber wavelengths 82a of greater than 2.5-microns, having a first lower radiant energy, are highly absorbed by steam and will superheat lower steam 54. The superheated lower steam 54 will then condense out as water layer 76 on divider 46 and heat the divider. Lower steam 54 will provide a uniform distribution of heat across divider 46 from said lower chamber 44. Alternatively, most second chamber lower wavelengths 82*b* of less than 2.5-microns, having a second lower radiant energy, are highly transmitted by steam, will pass through lower steam 54, and directly heat either water layer 76 or divider 46. Second lower-chamber wavelengths 82*b* transmitted through lower steam 54 will provide localized radiant energy. Whether water layer 76 or divider 46 is directly heated depends again the wavelength of lower-chamber wavelength 82. Wavelengths of 2.5-3.5 microns are more highly absorbed by water layers and will directly heat water layer 76. Most wavelengths of 3.5-microns are more highly transmitted by water layer 76, but absorbed by divider 46 and will directly heat the divider. Control system 78 can be used to tailor the wavelength and intensity outputs and determine how much lower radiant energy is used for superheating steam, how much lower radiant energy is used for direct heating of water layer 76 and how much lower radiant energy is used for direct heating of divider 46. The lower chamber heating scenarios discussed above provide different heating avenues for providing indirect heat to food 32 through divider 46. Combining multiple heating avenues so these avenues occur at the same time can increase efficiency and decrease cooking time. FIG. 14 provides a chart listing different heating avenues for apparatus 30.

Figure 6A:
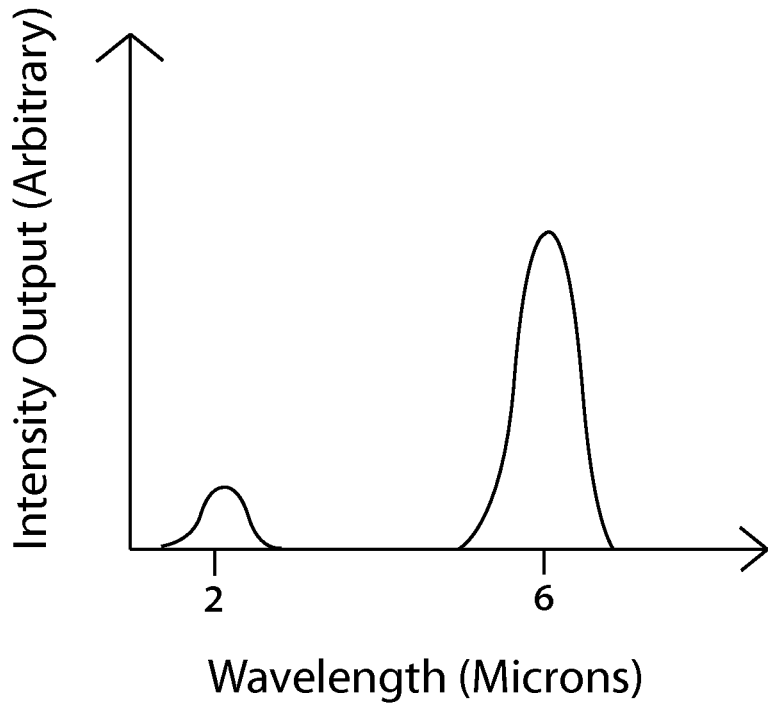
FIG. 6a is a graph depicting optimized intensity distributions as a function of wavelength for a set of emitters.
Figure 6B:
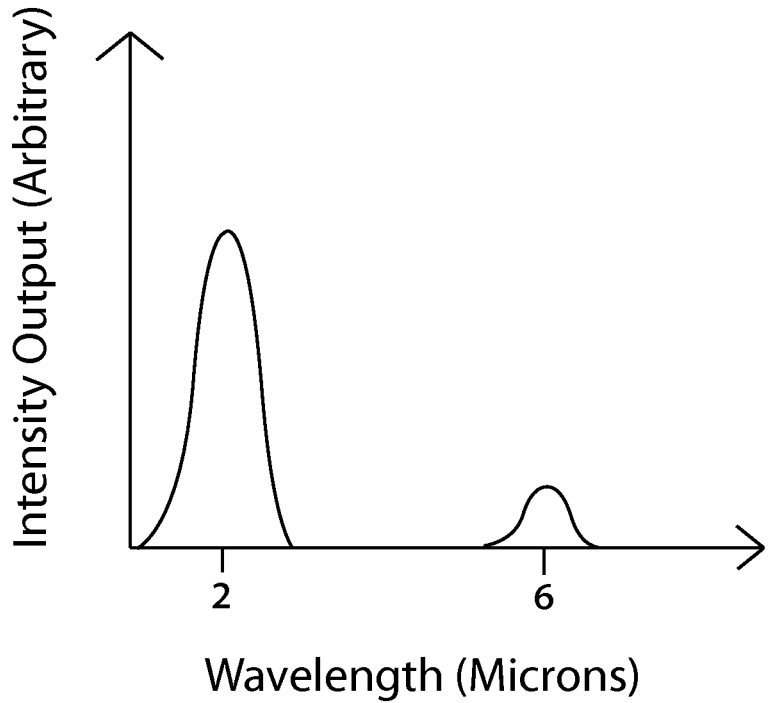
FIG. 6b is a graph depicting optimized intensity distributions as a function of wavelength for the set of emitters in FIG. 6a, now with different applied power to each emitter.
Figure 7:
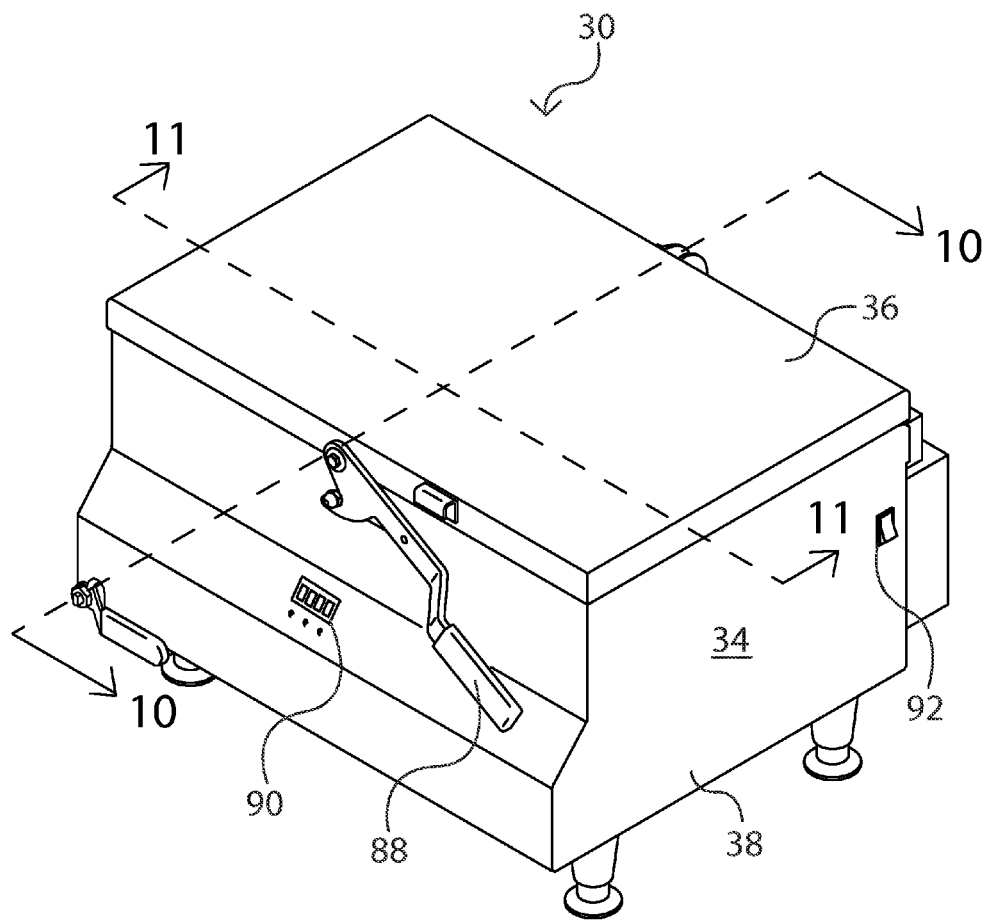
FIG. 7 is a front perspective view of an apparatus for treating food according to the present patent application incorporating elements and features depicted in the apparatus of FIGS. 2-4.
Figure 8:
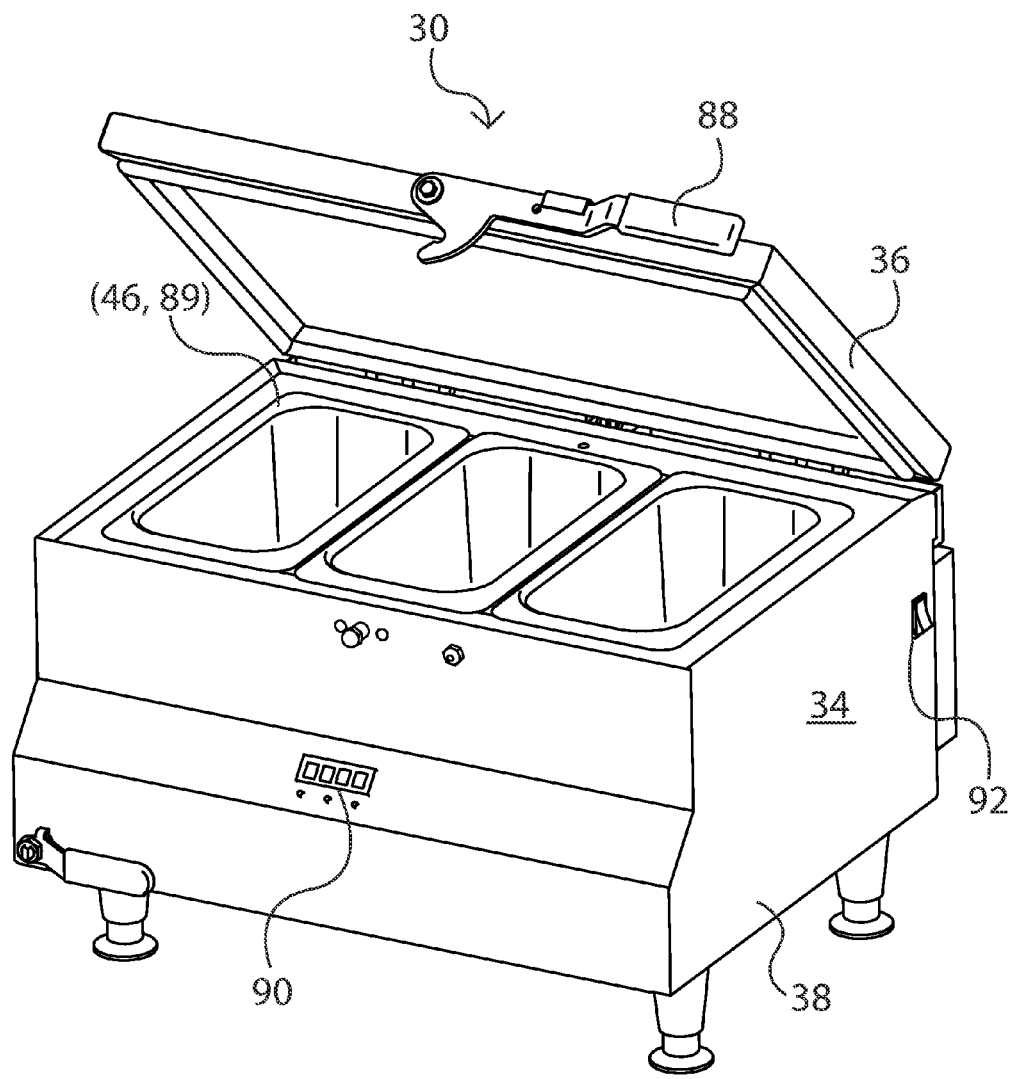
FIG. 8 is front perspective view of an apparatus of FIG. 7, the apparatus with the lid open.
Figure 9:
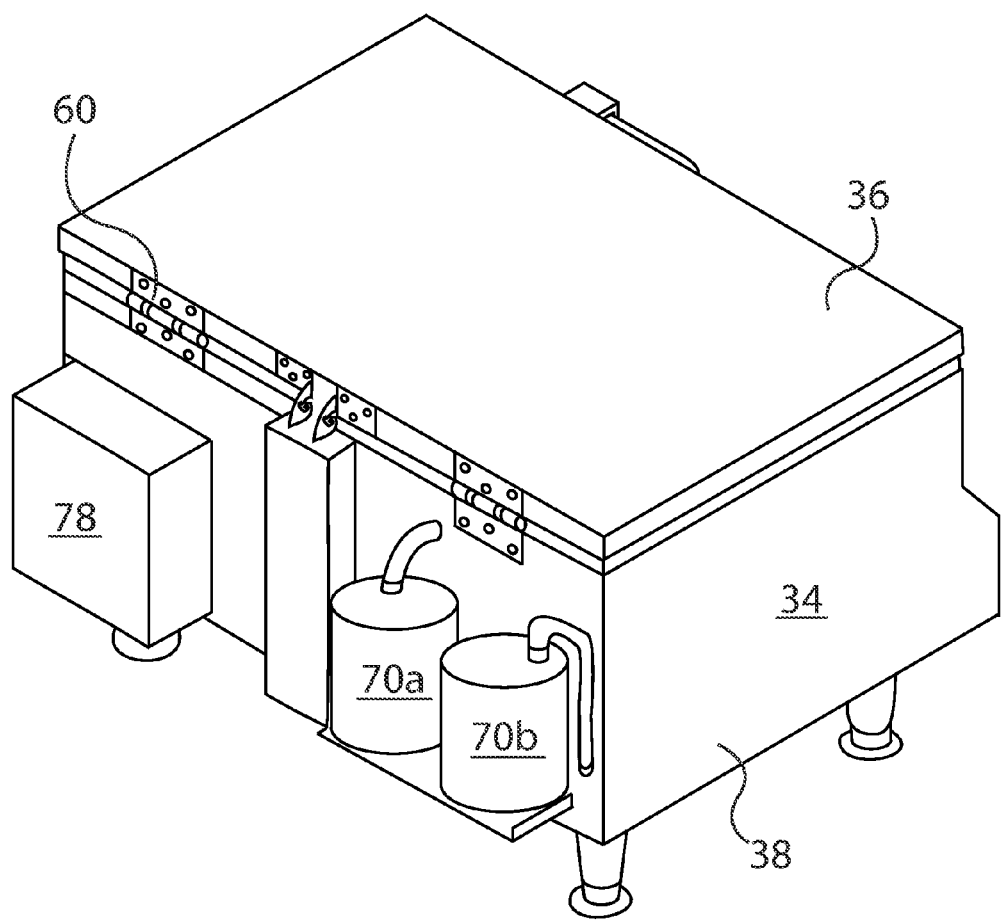
FIG. 9 is back perspective view of the apparatus of FIG. 7.
Figure 10:
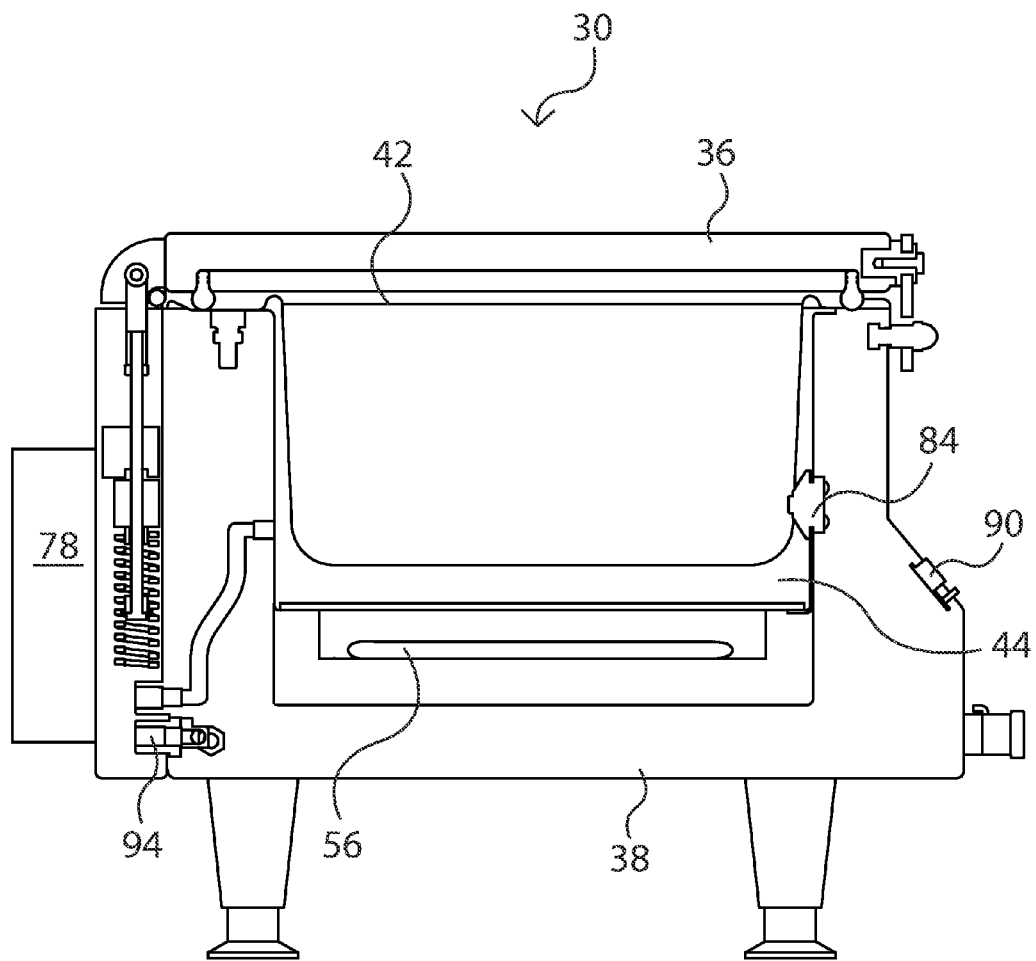
FIG. 10 is side sectional view of the apparatus of FIG. 7 along line 10-10.
Figure 11:
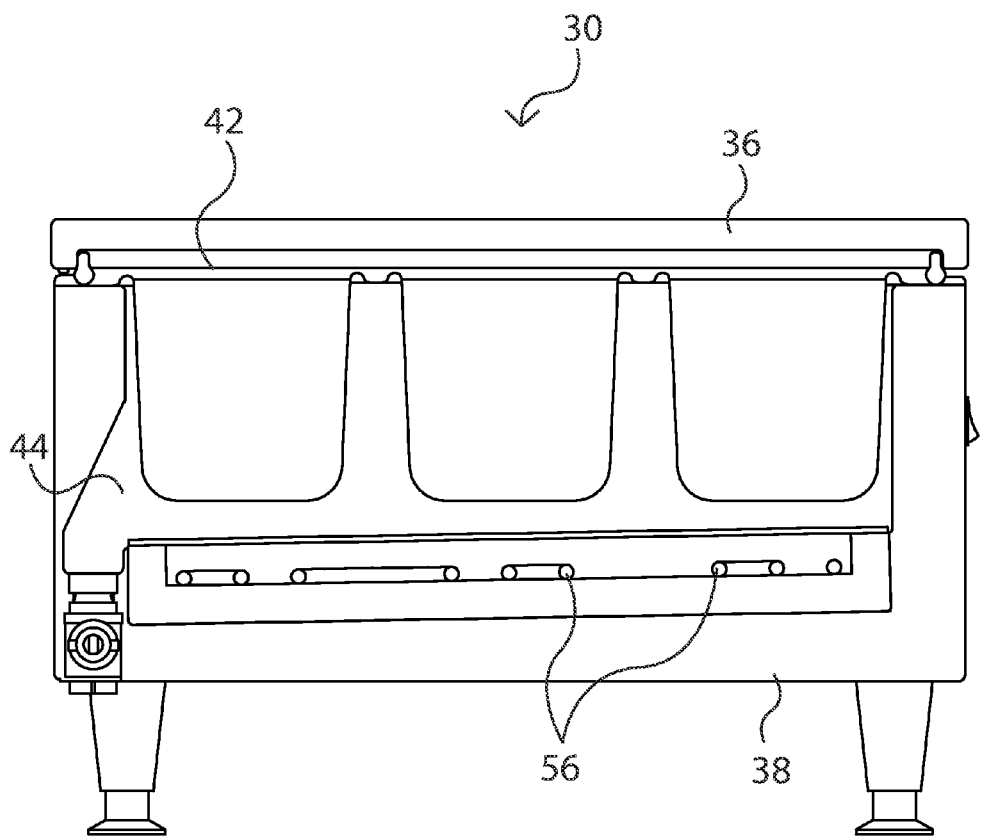
FIG. 11 is front sectional view of the apparatus of FIG. 7 along line 11-11.
Figure 12:
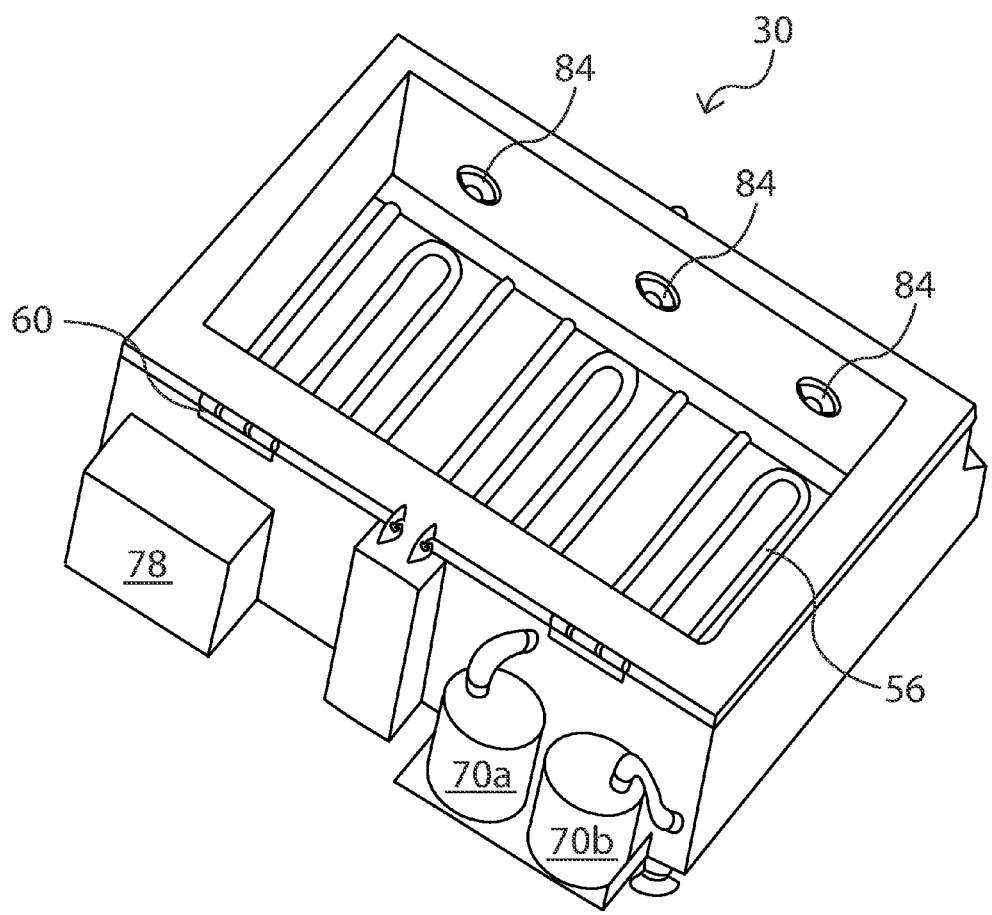
FIG. 12 is a partial cutaway, back, perspective view of an apparatus of FIG. 7 with the lid and divider removed.

FIGS. 6*a* and 6*b* depict an embodiment of apparatus 30 where combinations of lower infrared sources 56 are used to optimize heating for the different heating avenues of the system; i.e., superheating lower steam, directly heating water layer 76 and directly heating divider 46. For example lower infrared source 56 may include a first lower infrared source 56*a* that emits a first lower-chamber wavelength 82*a* that is in a wavelength range that is highly absorbed by steam and thereby can superheat steam. Lower infrared source 56 may also include a second infrared source 56*b* that emits a second lower-chamber wavelength 82*b* that is in a wavelength range that is more effectively transmitted through steam, but more highly absorbed by water layer 76 or divider 46.

One or more temperature sensors 84 may be integrated with apparatus 30 for monitoring the temperature of one or more from the group including upper chamber 42, lower chamber 44, divider 46 and food 32. In certain heating scenarios it may be advantageous to have the upper chamber 42 have an upper temperature, the lower chamber 44 have a lower temperature, wherein the upper chamber temperature is different than the lower chamber temperature.

One or more pressure-relief devices 62 may be mounted to control upper pressure in upper chamber 42 and lower pressure in lower chamber 44. In certain heating scenarios it may be advantageous to have the upper chamber 42 have an upper pressure, the lower chamber 44 have a lower pressure, wherein the upper chamber pressure is different than the lower chamber pressure. Lower chamber 44 is generally vented freely through vent 94

Control system 78 includes integrated circuitry that provides power to upper infrared source 58 and lower infrared source 56. Control system 78 may control pressure in upper chamber 42 and lower chamber 44, or both chambers. Control system 78 is connected to temperature sensors 84. Control system 78 may determine when the boiling point of source water in contact with food 32 has been reached, or other temperature related conditions for the food. Control system 78 activates cook times. Control system 78 may control a plurality of zones, each zone having its own temperature sensor 84. Control system 78 may have selectable modes for treating food. These selectable modes may be one or more from the group including steaming, reheating, boil, hold hot, braise and defrost (see FIG. 15).

Control system 78 also controls upper infrared source 58 and lower infrared sources 56, 56*a* and 56*b*. By control system 78 providing the specific power to each infrared source (a.k.a. emitter), the output of each infrared source can be tailored to a specific wavelength. The specific wavelength and how long the radiant energy of that specific wavelength is applied determines the type and amount of heating that will occur for a specific heating avenue. Infrared sources may be constant or pulsed between different wavelengths to generate different heating scenarios.

One exemplary embodiment of apparatus 30 is shown in FIGS. 7-13*b*. Apparatus 30 has use primarily as a cooking appliance. Apparatus 30 comprises a housing 34 made of No. 304 stainless steel with insulated walls. Housing 34 includes lid 36 and base 38. A hinge 60 and latch 88 system are used to secure lid 36 to base 38 and to help create a seal between the lid and divider 46. Divider 46 separates cavity 40 into two spaces, upper chamber 42 and lower chamber 44. In the present embodiment divider 46 is comprised of a plurality of dividers, i.e. three standard food inset pans 89 usually constructed of polished aluminum or stainless steel that holds foods to be heated or served. Separate heating zones are set up to correlate with each pan. A separate lower infrared source 56 is provided for each pan 89. A separate temperature sensor 84 is provided for each heating zone. Control system 78 integrates power switch 92, heating mode selector 90, temperature sensors 84, upper steam generator 70*a*, lower infrared source 56 and lower steam generator 70*b*.

During operation of apparatus 30 lower infrared source 56 is engaged to generate peak radiant energy with wavelengths of 1-9 microns. Separate steam sources, upper steam 52 and lower steam 54, are connected with selective control to provide steam to upper chamber 42 and lower chamber 44. Lower chamber 44 receives infrared energy from lower infrared source 56 and latent heat contained within lower steam 54 from lower steam generator 70*b*. Together lower infrared source 56 and lower steam 54 heat divider 46, which indirectly heats food 32 above the divider. Upper chamber 42 receives a separate upper steam 52 and is maintained under pressure to enhance contact, temperature and energy transfer directly to food 32. Lower steam 54 is vented freely through vent 94, while upper steam 52 has controlled venting through pressure-relief device 62 to maintain a pressure environment in upper chamber 42.

During operation lower infrared source 56 is engaged to generate two peak wavelengths. These peak wavelengths have a radiant energy absorbed by lower steam and a radiant energy this is transmitted through the steam and heats the divider. When lower steam 54 is present in the emission field of lower infrared source 56, water molecules in the lower steam absorb much of the IR energy in wavelengths greater than 2.5-microns causing the lower steam to superheat storing more energy. The lower steam 54 by nature will fill the void of lower chamber 44 and flow to conform to the shape of divider 46. Making contact with divider 46 lower steam 54 condenses on the divider and gives up its latent heat to the divider surface. The lower steam 54, absorbing the IR energy and heating the lower water molecules, has more latent energy to release to divider 46 when the lower steam makes contact with divider 46 and the energy contributed by the IR emissions has been spread from a direct line heating of the divider to one of takes the shape of all lower steam and thereby spreads the heat transfer over the entire divider. Heating of divider 46 and food 32 held on top of the divider is faster and more uniform by this combined process rather than with either infrared radiant energy or steam alone. Furthermore, at the same time the IR energy having wavelengths shorter than 2.5-microns travel through the field of steam until they make contact with the surface of divider 46 and are converted to heat in the divider wall thus using a broader spectrum of wavelengths to do the work of heating, again shortening the time to reach the desired temperature.

Further performance improvement is achieved as lower steam 54, that has condensed on the surface of divider 46, now serves an additional purpose of increasing the absorption properties of the divider wall providing more energy to the wall to be used to heat the product. Once lower steam 54 has made contact and condensed on the surface a greater percentage of wavelengths over 2.5-microns can be generated and absorbed into the wall, thus transferring heat faster to the divider or object to be heated.

Multiple emitters (infrared sources 56a and 56b) can be set for different peak wavelengths that can be combined to create unique desired heating effects. Emitters controlled by control system 78 can be adjusted in peak wavelengths to particular conditions as suits the applications needs and the conditions in the cavity environment.

In the present exemplary embodiment it is desirable to have a freely vented lower steam 54 in lower chamber 44, replacing the lower steam as desired to create the effects described above. Lower steam 54 is introduced into the IR field, picks up energy from lower infrared source 56, makes contact with the divider wall and if not fully condensed vents to atmosphere. Additional lower steam 54 can be introduced or IR can be left to do its heating as desired.

During operation, upper steam 52 in upper chamber 42 will skim and take the shape of the inside of lid and exit the cavity if free vented. It is desirable therefore to provide a restricted venting in the upper chamber 42 by way of pressure-relief device 62. In this way the steam is slightly pressurized, forcing it down to make contact with food 32 and the cavity walls, and held there until upper steam 52 gives up its latent heat and condenses. This upper steam 52 therefore provides a separate heating process from that of the heating work being done in the lower cavity. The functions can be combined in desirable combinations to optimize heat uniformity and speed up heat transfer for the specific food preparation process being undertaken. By these combinations, three types of heating can be applied to food 32 using different heating avenues at the same time or in intermittent intervals.

Figure 16:
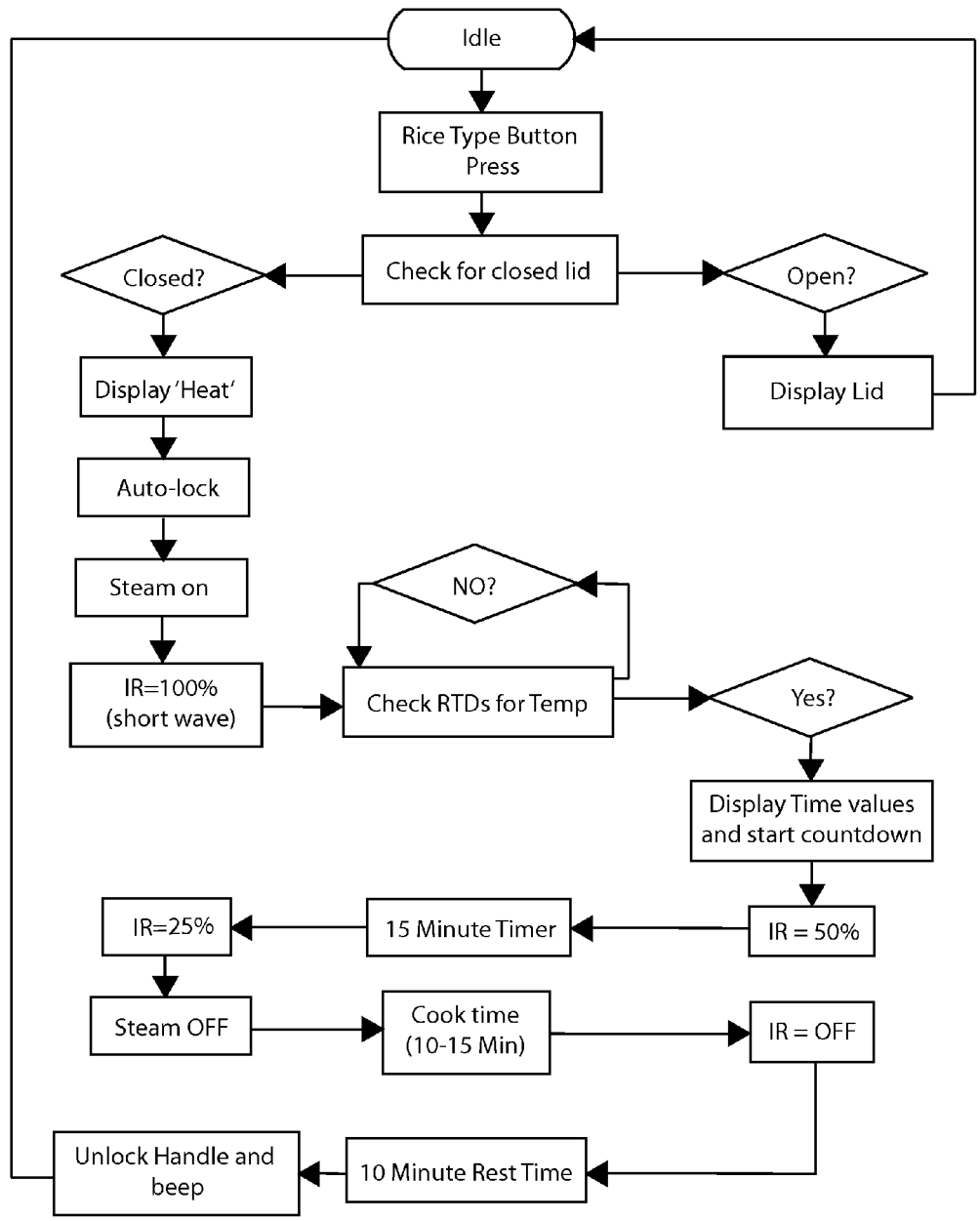
FIG. 16 is a diagram depicting process details of a rice cooking mode according to the present patent application.

An exemplary "Rice Cooking Mode" is provided in FIG. 16. Control system 78 would regulate this cooking mode.

Figure 17:
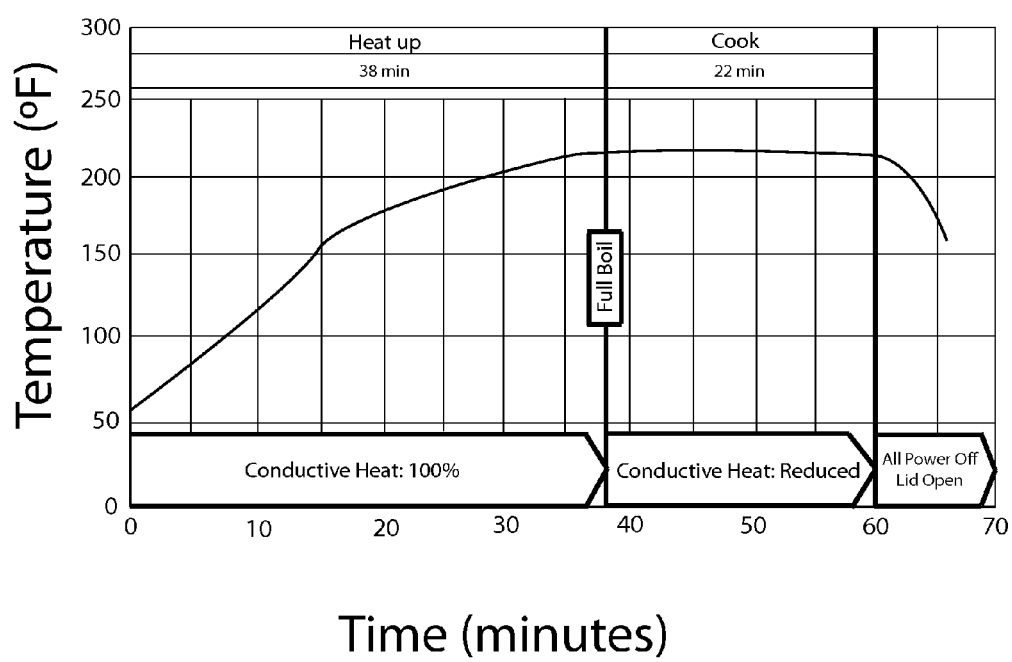
FIG. 17 is a diagram depicting a thermal profile of a comparative rice cook process.
Figure 18:
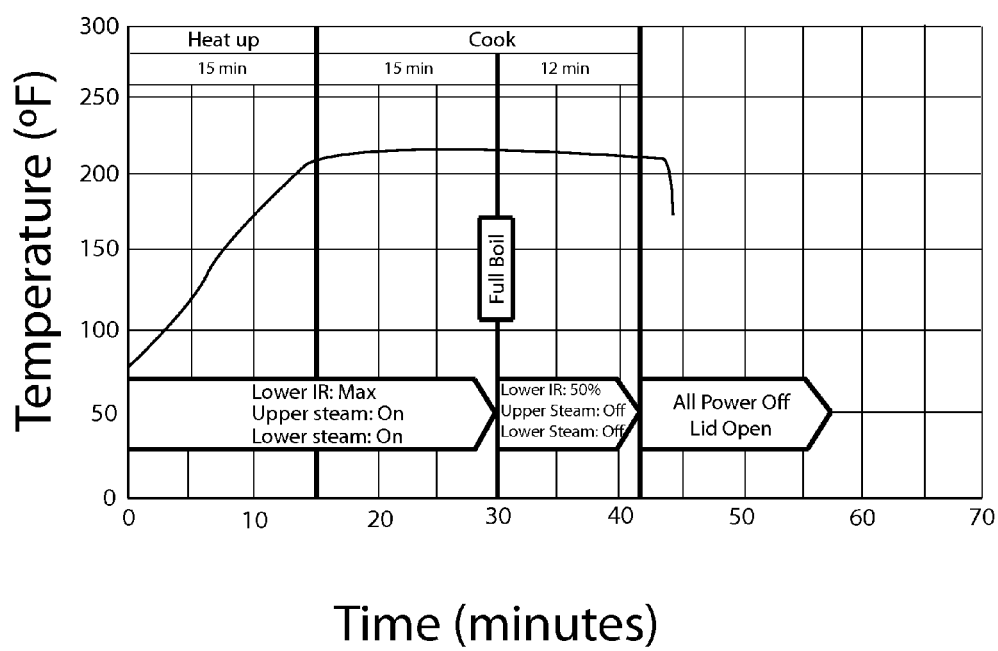
FIG. 18 is a diagram depicting a thermal profile of a new rice cook process according to the present patent application.

FIGS. 17 and 18 show data for the comparison of a standard cooking mode for brown rice with that of the new process provided by apparatus 30. In the comparative example, FIG. 17, heat is applied directly as conductive heat to heat and boil the rice. The whole cooking process takes about 60-minutes. In the new process, using apparatus 30, FIG. 18, heat is applied by multiple heating avenues as shown in the figure and can cook the rice in 42-minutes, a 30-percent time savings. Along with the time savings, energy savings may be realized as well.

Figure 13A:
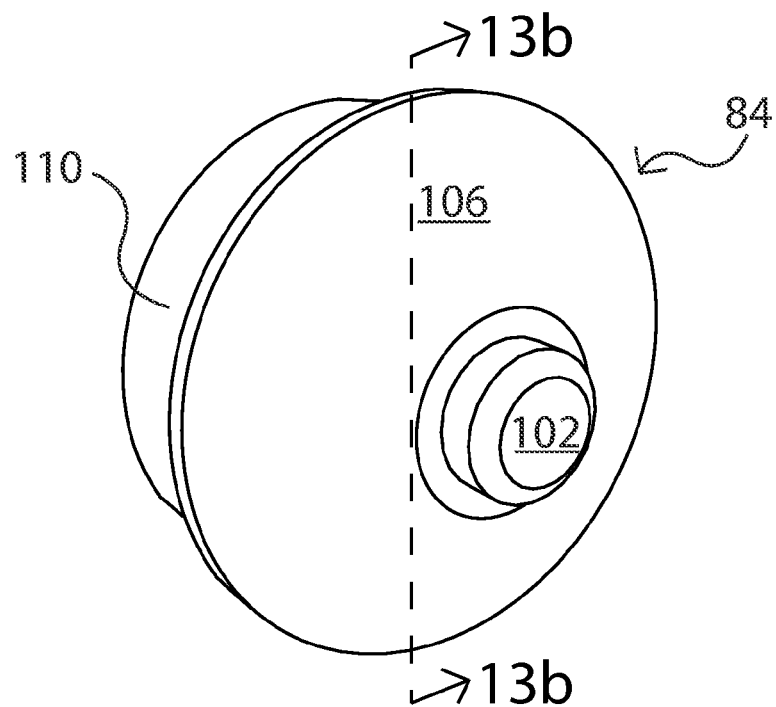
FIG. 13a is detailed perspective view of the temperature sensing device depicted in FIGS. 10 and 12.
Figure 13B:
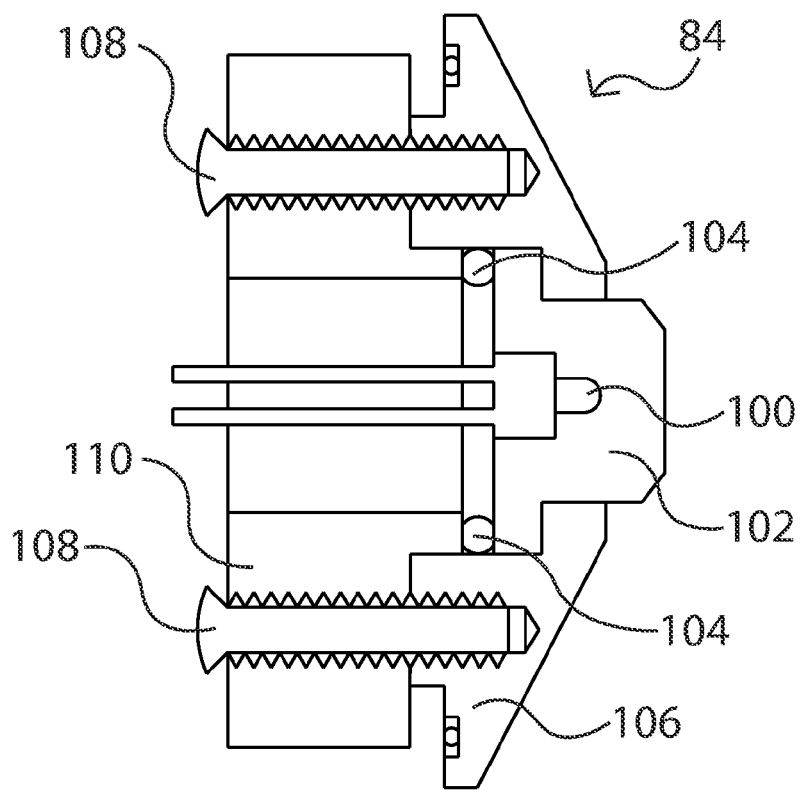
FIG. 13b is detailed sectional view of the temperature sensing device depicted in FIG. 13a along line 13b-13b.

FIGS. 13a and 13b show details of temperature sensor 84. Temperature sensor 84 comprises sensor 100 that is embedded in thermal contact 102. Thermal contact 102 rests on a gasket 104 that is formed from a resilient material. A guide 106 having a tapered surface is provided for supporting sensor 100 and for facilitating easy placement and alignment of temperature sensor 84 to the surface which the sensor will be monitoring, i.e. divider 46 or pan 89 containing food 32. Fasteners 108 interface with holding block 110. Guide 106 and holding block 110 are mounted to apparatus 30 by fasteners 108. Temperature sensor 84 has the property that when divider 46 is secured in place within cavity 40, gasket 104 formed of resilient material forces the temperature sensor against the wall of the divider to make good thermal contact.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. An apparatus for treating food, comprising:
   a) a housing including a lid portion and a base portion, said lid portion and said base portion separable and defining a cavity therein;
   b) said cavity completely divided into an upper chamber and a lower chamber by a divider, said upper chamber for holding the food;
   c) a steam source connected to provide upper steam to said upper chamber and lower steam to said lower chamber;
   d) a lower infrared source positioned within said lower chamber, said lower infrared source optimized to both superheat steam with a first lower-chamber wavelength and heat said divider with a different second lower-chamber wavelength highly transmitted through said steam; and
   e) wherein the food is heated by direct heat transfer in said upper chamber, wherein the food is heated by indirect heat transfer from the conduction of heat through said divider from said lower chamber.

2. The apparatus as recited in claim 1, wherein said divider is a plurality of pans.

3. The apparatus as recited in claim 1, further comprising a plurality of heating zones in said lower chamber.

4. The apparatus as recited in claim 1, wherein said steam source is from an aqueous solution directly heated by passing current through said aqueous solution.

5. An apparatus for treating food, comprising:
   a) a housing including a lid portion and a base portion, said lid portion and said base portion separable and defining a cavity therein;
   b) said cavity divided into an upper chamber and a lower chamber by a divider, said upper chamber for holding the food, said lid portion seals with said divider to create a pressure-controlled environment in said upper chamber;
   c) a steam source connected to provide upper steam to said upper chamber and lower steam to said lower chamber;
   d) a lower infrared source positioned within said lower chamber; and
   e) wherein the food is heated by direct heat transfer in said upper chamber, wherein the food is heated by indirect heat transfer from the conduction of heat through said divider from said lower chamber.

6. The apparatus as recited in claim 1, wherein said direct heat transfer is from upper latent heat from said upper steam.

7. The apparatus as recited in claim 1, wherein said upper chamber has an upper infrared source, wherein said direct heat transfer is from upper radiant energy from said upper infrared source.

8. The apparatus as recited in claim 1, wherein said lower infrared source directly heats said divider by a second lower-chamber wavelength from said lower infrared source.

9. The apparatus as recited in claim 1, wherein a layer of water condenses in said lower chamber on said divider, wherein said layer of water is heated by a second lower-chamber wavelength from said lower infrared source, wherein said layer of water directly heats said divider.

10. The apparatus as recited in claim 1, wherein said divider is heated by direct heat transfer from lower latent heat from said lower steam.

11. The apparatus as recited in claim 1, wherein said lower infrared source superheats said lower steam by a first lower-chamber wavelength that is preferentially absorbed by said lower steam.

12. The apparatus as recited in claim 1, wherein said lower infrared source has lower-chamber wavelengths, wherein said lower-chamber wavelengths are adjustable between wavelengths, wherein said lower-chamber wavelengths are adjustable by power applied to said lower infrared source.

13. The apparatus as recited in claim 1, further comprising a control system, wherein said control system determines by a temperature sensor external from the food when the boiling point of a source of water in contact with the food has been reached and activates a cook time.

14. The apparatus as recited in claim 5, further comprising a control system, wherein said control system controls a plurality of heating zones within a given chamber, wherein said given chamber is at least one from the group consisting of said upper chamber and said lower chamber, wherein each heating zone has a temperature sensor.

15. The apparatus as recited in claim 1, further comprising a control system; wherein said control system has selectable modes for treating food; wherein said selectable modes are at least one from the group consisting of steaming, reheating, boil, hold hot, braise and defrost.

16. The apparatus as recited in claim 5, wherein said upper chamber has an upper chamber pressure, wherein said lower chamber has a lower chamber pressure, wherein said upper chamber pressure is different than said lower chamber pressure.

17. The apparatus as recited in claim 1, wherein said upper chamber has an upper chamber temperature, wherein said lower chamber has a lower chamber temperature, wherein said upper chamber temperature is different than said lower chamber temperature.

18. The apparatus as recited in claim 1, wherein said lower infrared source heats said lower steam to distribute infrared energy from said lower infrared source evenly within said lower chamber.

19. The apparatus as recited in claim 5, wherein said upper chamber has a pressure-relief device mounted to control said pressure-controlled environment in said upper chamber.

20. The apparatus as recited in claim 5, wherein said lower infrared source superheats steam in said lower chamber.

21. An apparatus for treating food, comprising:
  a) a housing including a lid portion and a base portion, said lid portion and said base portion separable and defining a cavity therein;
  b) said cavity divided into an upper chamber and a lower chamber by a divider, said upper chamber for holding the food;
  c) a steam source connected to provide upper steam that is pressurized in said entire upper chamber and lower steam to said lower chamber;
  d) a lower infrared source positioned within said lower chamber, said lower infrared source superheating said lower steam to create superheated lower steam; and
  e) wherein the food is heated in said upper chamber by said upper steam at the same time latent heat is supplied through said divider by said superheated lower steam.

22. The apparatus as recited in claim 21, further comprising a first lower-chamber infrared wavelength that superheats said steam and a second lower-chamber infrared wavelengths that heats said divider.

23. The apparatus as recited in claim 22, wherein said first lower-chamber wavelength is concentrated in an optimal range of greater than 2.5-microns to superheat said steam.

24. The apparatus as recited in claim 22, wherein said second lower-chamber wavelength is concentrated in an optimal range of 2.5-3.5 microns to heat condensed water on said divider to heat said divider.

25. The apparatus as recited in claim 22, wherein said second lower-chamber wavelength is concentrated at generally 3.5-microns to pass through condensed water on said divider and heat said divider.

26. The apparatus as recited in claim 22, wherein said first lower-chamber infrared wavelength and said second lower-chamber infrared wavelengths can be independently optimized at the same time.

\* \* \* \* \*